Sept. 10, 1974    C. E. KESLER    3,834,916

FIBER-REINFORCED CEMENT COMPOSITE

Filed March 23, 1972    4 Sheets-Sheet 1

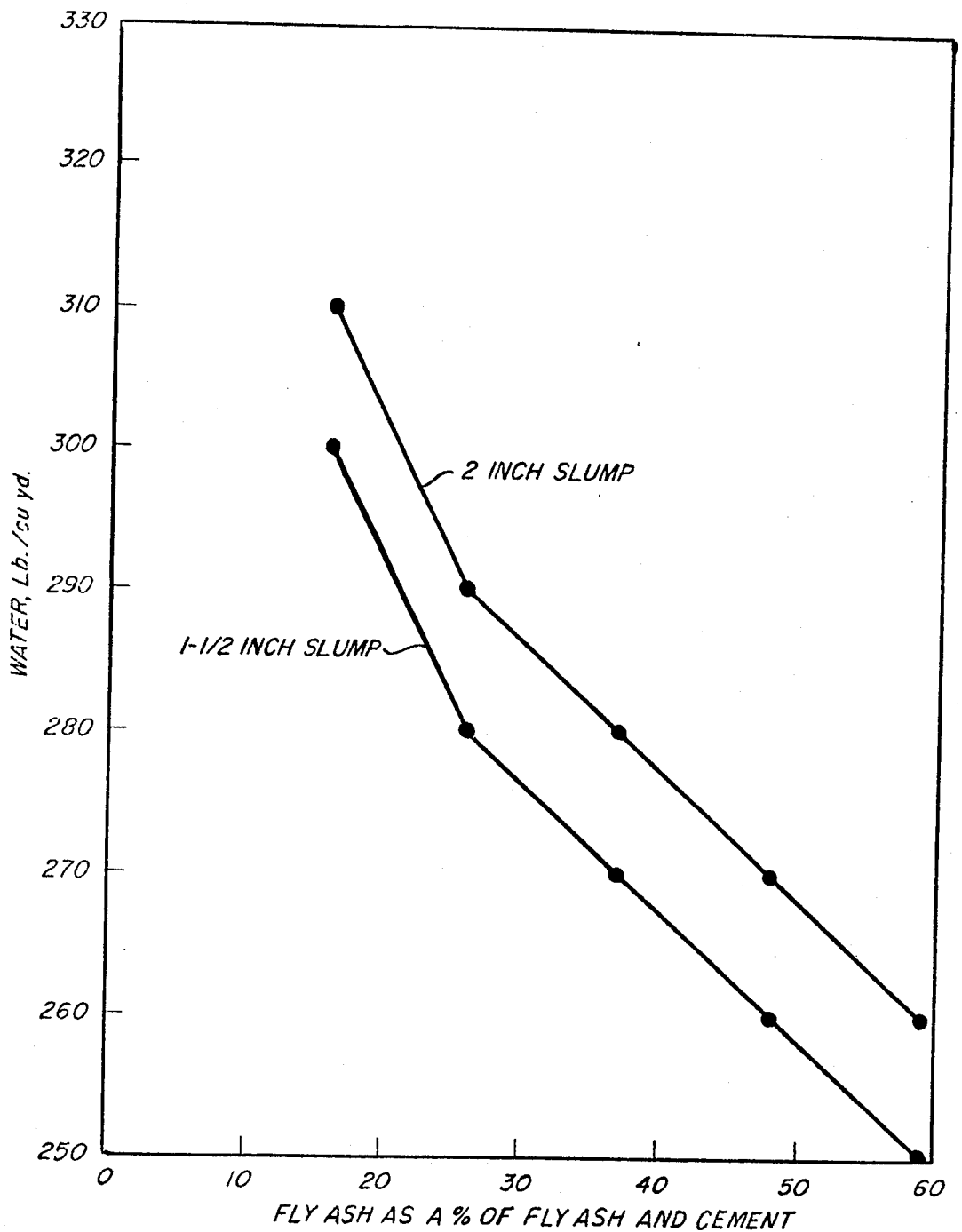

United States Patent Office 3,834,916
Patented Sept. 10, 1974

3,834,916
FIBER-REINFORCED CEMENT COMPOSITE
Clyde E. Kesler, Champaign, Ill., assignor to United
States Steel Corporation
Filed Mar. 23, 1972, Ser. No. 237,300
Int. Cl. C04b 7/12
U.S. Cl. 106—99                           1 Claim

ABSTRACT OF THE DISCLOSURE

A reinforced composite having either a castable concrete matrix mass or a castable mortar matrix mass is disclosed. The matrix mass has about 300 lbs. to about 900 lbs. per cubic yard of hydraulic cement; about 220 lbs. to about 450 lbs. per cubic yard of water; about 0.1 to about 10.0% by volume per cubic yard of a plurality of discontinuous reinforcing filaments; about 40 lbs. to about 450 lbs. per cubic yard of finely divided pozzolan type material; and aggregate in a sufficient amount by volume to provide a total of 1 cubic yard of matrix mass.

BACKGROUND OF THE INVENTION

Heretofore, fly ash has been employed in mortar and concrete as shown in the following U.S. Patents:

| U.S. Pat. No. | Inventor | Issued |
| --- | --- | --- |
| 1,886,933 | Askanasy | 11/8/32 |
| 2,250,107 | Nelles | 7/22/41 |
| 2,446,990 | Schuetz | 8/10/48 |
| 2,463,561 | Riley | 3/8/49 |
| 2,517,993 | Falco | 8/8/50 |
| 2,622,989 | Keyishian | 12/23/52 |
| 2,698,252 | Havelin et al | 12/28/54 |
| 2,987,406 | Minnick | 6/6/61 |
| 3,092,505 | Demaison | 6/4/63 |
| 3,232,777 | Bush | 2/1/66 |
| 3,565,648 | Mori et al | 2/23/71 |

U.S. Pat. 2,987,406 discloses a cement composition containing fly ash, a glass matrix embedded with crystalline particles of a ferromagnetic spenil and aggregate.

U.S. Pat. 2,463,561 shows a cement composition containing metal filings.

U.S. Pat. 2,446,990 discloses a cement composition containing asbestos fiber, fly ash and an aggregate.

U.S. Pat. 3,092,505 discloses a cement composition containing metal powder and mineral fibers.

The remaining patents are of general interest in that they disclose cement compositions containing fly ash and aggregate.

OBJECTS OF THE INVENTION

It is the general object of this invention to avoid and overcome the foregoing and other difficulties of and objections to prior art practices by the provision of an improved reinforced composite which:

1. utilizes a hydraulic cement for bonding the matrix mass of the reinforced composite together;
2. utilizes water in the matrix mass of the reinforced composite in sufficient amount to hydrate the cement in the matrix mass, to provide positioning (flexibility) and screeding, troweling, consolidating and finishing (workability) in the matrix mass and to provide a predetermined slump in the matrix mass of the reinforced composite;
3. utilizes a plurality of discontinuous reinforcing filaments to reinforce the matrix mass, to restrict crack propagation in the matrix mass and to increase flexibility in the matrix mass;
4. utilizes a finely divided pozzolan (fly ash) in the matrix mass of the reinforced composite to:

a. improve flexibility and workability in the matrix mass;
b. reduce the amount of water in the matrix mass thereby increasing the strength characteristics of the matrix mass and thereby also reducing cracking due to drying shrinkage in the matrix mass;
c. fill the interstitial spaces in the matrix mass and to enhance the mechanical lubricity of the matrix mass;
d. reduce undesirable heat development and premature setting of the matrix mass by reducing the cement content in the matrix mass;
e. reduce the free lime or soluble salts, such as $Ca(OH)_2$, $CaSO_4$ or the like, generated in the hydration of this cement by converting the free lime to insoluble salts, such as mono-calcium silicate, mono-calcium aluminate or the like, thereby reducing leaching of lime out of the matrix mass and to provide additional cementitious compounds, i.e., mono-calcium silicate, mono-calcium aluminate or the like;
f. reduce segregation of the cement, the discontinuous filaments, and the aggregate in the matrix mass by filling the interstitial voids therebetween;
g. reduce permeability of a fluid through the matrix mass after such matrix mass has hardened;
h. provide resistance in the matrix mass to sulfate and acid attack contained in surrounding earth or soil;
i. reduce the deterioration of the matrix mass due to an alkali aggregate reaction;
j. enhance the long term strength of the matrix mass due to the increased long term strength of the pozzolan or fly ash; and
k. permit a thinner section (than a conventional section) of the matrix mass to be formed due to the mechanical lubricity of the fly ash;

5. utilizes an appropriate amount of an aggregate which, when such aggregate is added to the cement, the water, the filaments, and the pozzolan or fly ash provides an inert filler material which is resistant to wear and abrasion when the aggregate is bonded to the matrix mass by the cement mass and reducing the cost of the matrix mass;
6. provides increased long term skid resistance on the matrix mass due to the surface roughness caused by the filaments and aggregates during finishing;
7. provides increased resistance to defect and crack reflection in the matrix mass from an underlying base in an overlay application;
8. provides a minimum number of joints in the hardened matrix mass in a sidewalk or highway application; and
9. provides enhanced resistance to fatigue cracking in the matrix mass.

BRIEF SUMMARY OF THE INVENTION

The aforesaid objects of this invention, and other objects which will become apparent as the description proceeds, are achieved by providing an improved reinforced composite having a matrix mass, which matrix mass of concrete or mortar has about 300 lbs. to about 900 lbs. of a hydraulic cement per cubic yard; about 220 lbs. to about 450 lbs. of water per cubic yard; about 0.1 to about 10.0% by volume of a plurality of discontinuous reinforcing filaments per cubic yard; about 40 lbs. to about 450 lbs. of finely divided pozzolan type material per cubic yard and aggregate in a sufficient amount by volume to provide a total of one cubic yard of matrix mass.

BRIEF DESCRIPTION OF THE SEVERAL VIEWS OF THE DRAWINGS

For a better understanding of this invention, reference should be had to the accompanying drawings, wherein:

FIG. 2 is a graph showing water content (lbs./cu. yard) in the concrete mix as ordinate vs. fly ash as a percent of total fly ash and cement for a 2" slump and a 1½" slump and about 1½% by volume of steel fiber;

Figure 1:
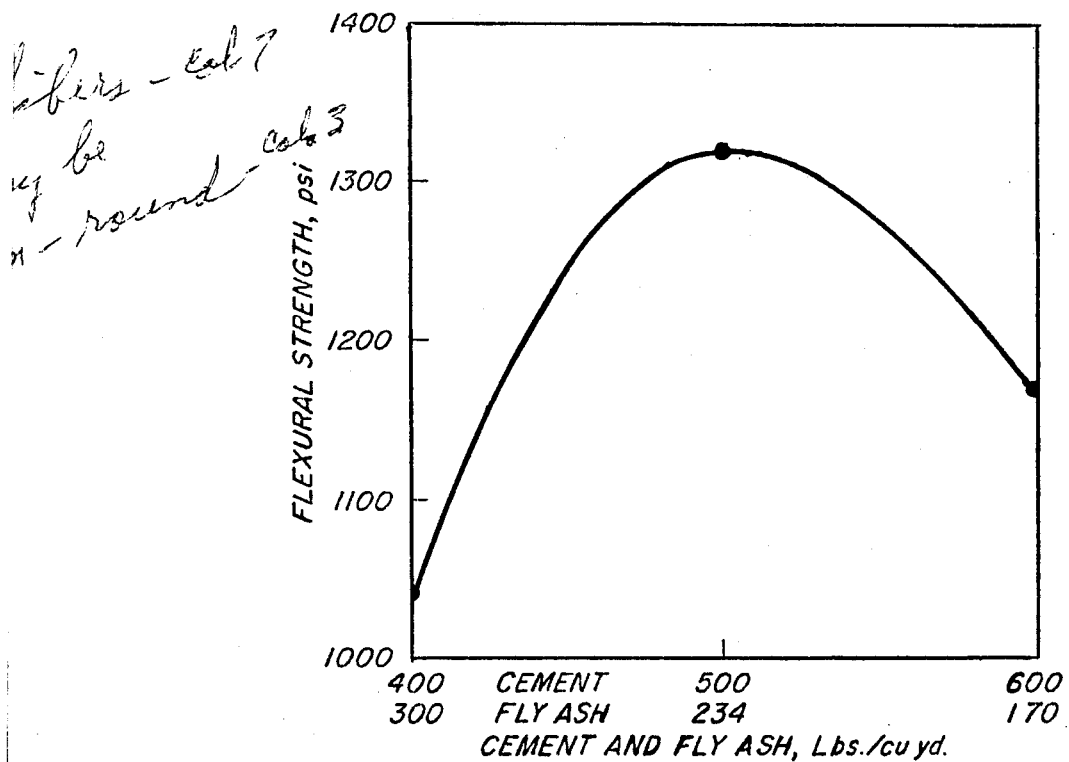
FIG. 1 is a graph showing flexural strength (in p.s.i.) at 28 days as ordinate vs. combinations of cement and fly ash in lbs./cu. yard as abscissa for a constant 4" slump and about 1½% by volume of steel fiber.

Although the principles of this invention are broadly applicable to reinforced composites, this invention is particularly adapted for use in conjunction with reinforced composites containing finely divided pozzolan and a plurality of discontinuous reinforcing filaments, and hence it has been so illustrated and will be so described.

DETAILED DESCRIPTION

With specific reference to the form of this invention, a reinforced composite is disclosed. The reinforced composite is either a castable concrete matrix mass or a castable plain matrix mass containing a hydraulic cement.

Hydraulic Cement

The matrix mass contains hydraulic cement (such as one of the types shown below in the range of about 300 pounds to about 900 pounds per cubic yard) of the matrix mass for bonding the matrix mass together. Cements employable in this invention may be Portland cements of the type described in the 1970 ASTM Standards C150–70, Types 1–5, and in particular, Type 1, and in addition expansive cement, shrinkage compensating cement, regulated set cements, or ASTM C595–68 types IS or IP cements or the like.

Water

Water is added to the matrix mass in the range of about 220 pounds to about 450 pounds per cubic yard of the matrix mass, such amount being sufficient to hydrate the cement in the matrix mass and to provide placeability for positioning of the matrix mass, for workability, such as screeding, floating, troweling, consolidating, finishing or the like of the matrix mass and for providing the desired slump or workability for machine, manual or pumping applications. The test for slump of Portland Cement concrete is described in the ASTM Standard C143.

Discontinuous Reinforcing Filaments

The matrix mass contains a plurality of discontinuous reinforcing filaments in the range of about 0.1 to about 10.0% by volume per cubic yard of the matrix mass. Such discontinuous reinforcing filaments reinforce the matrix mass, restrict crack propagation in the matrix mass and increase flexibility in the matrix mass when such filaments are bonded to the matrix mass by the cement.

These discontinuous filaments may have, for example, a non-round cross sectional configuration having a width dimension and a thickness dimension with the width-to-thickness ratio being not greater than about 5.0. The thickness dimension is desirably in the range of about 0.001–0.03". The discontinuous filaments have a desirable length of about ¼ to about 3". Expressed in pounds, the discontinuous filaments in the matrix mass are in the range of about 13 lbs. to about 1300 lbs. per cubic yard of the matrix mass.

It will be understood by those skilled in the art that discontinuous filaments may be employed having a non-rectangular cross sectional configuration and the dimensions and characteristics of the above-described discontinuous filaments.

Fly Ash

Such matrix mass also contains a pozzolan type material, such as fly ash or the like, in the range of about 40 lbs. to about 400 pounds per cubic yard of either the concrete matrix mass or the mortar matrix mass. Such pozzolan type material is described in 1970 ASTM Standards C618, Class F. The fly ash is employed to improve the placeability and workability of the matrix mass, and to reduce the amount of water in such matrix mass thereby increasing the strength characteristics of the matrix mass and reducing cracking due to drying shrinkage in the matrix mass. Such fly ash fills the interstitial spaces in the matrix mass and enhances the mechanical lubricity of the matrix mass. The fly ash reduces undesirable heat development and premature setting of the matrix mass by reducing the cement content in the matrix mass.

The fly ash provides the necessary amount of paste needed in fiber reinforced concrete with reduced amounts of hydraulic cements. The fly ash reduces the free lime or soluble salts, such as $Ca(OH)_2$, $CaSO_4$ or the like, generated in the hydration of the cement by converting the free lime to insoluble salts, such as calcium silicates, calcium aluminates, or the like, with attendant reduction of the leaching of the lime out of the matrix mass, and resultant provision of additional cementitious compounds, such as monocalcium silicate, monocalcium aluminate, or the like. In addition, the fly ash reduces bleeding of the water to the surface of the matrix mass during placement and consolidation of the matrix mass. Further, the fly ash reduces segregation of the cement, the discontinuous filaments, and the aggregate in the matrix mass by filling the interstitial voids therein and also reduces the permeability of any fluid through the matrix mass after it has hardened. Also, the fly ash provides resistance in the matrix mass to sulfate and acid attack from surrounding earth or soil containing such sulfates and acids. Again, the fly ash reduces deterioration of the matrix mass due to an alkali reaction with the aggregate in the matrix mass which might contain alkali compounds. Long term strength of the matrix mass is enhanced by the presence of the fly ash due to the new cementitious products formed by a reaction between the free lime produced by the hydration of the cement and the fly ash. Further, the fly ash permits the formation of thin sections of the matrix mass.

Aggregates

Aggregates such as, for example, sand and pea gravel or the like, are then added to the matrix mass in a sufficient amount to provide a total of one cubic yard of matrix mass when such aggregate is added to the cement, the water, the discontinuous filaments, and the fly ash. This aggregate provides an inert material which is resistant to wear and abrasion when it is bonded to the matrix mass by the cement, thus minimizing creep and shrinkage in the matrix mass and substantially reducing the cost of the matrix mass.

The above described preferred embodiment of the reinforced composite provides increased long term skid resistance on the surface of the matrix mass due to the surface roughness caused by the presence of the discontinuous filaments and the aggregate following the finishing of the matrix mass. Such reinforced composite provides increased resistance to defect and crack reflection in the matrix mass in an overlay application from an underlying base. Further, the improved reinforced composite provides a minimum number of joints in a roadway, roadway overlay, sidewalk, floor application of the matrix mass, or the like, and provides enhanced resistance to fatigue cracking in the matrix mass.

Water Reducer and Retarder

A water reducing admixture of the lignin type or a water reducer retarder admixture of the lignin or hydroxylated carboxylic acid type as set forth in the 1970 ASTM Standards C494–C68 is added to the matrix mass to provide chemical lubricity therein. The water reducer or water reducer retarder reduces the surface attraction of the constituents of the matrix mass, such as sand, fibers, gravel, and the like, thereby reducing the amount of water required in the matrix mass for placeability and workability of such matrix mass. The retarder may be used to reduce slump loss and maintain workability over an extended time period, such as in excess of 90 minutes or the like.

It is evident from a consideration of Table I and FIG. 1 that the optimum combination of cement and fly ash (lbs./cu. yd.) with about 1½% by volume of steel fiber is about 500 lbs. of cement and 234 lbs. of fly ash/cu. yd., thereby producing, in this case, an optimum 28-day flexural strength (p.s.i.) of about 1320 p.s.i.

Normally, as the cement portion (lbs./cu. yd.) in a concrete mix increases, the 28-day flexural strength (p.s.i.) increases in about a straight line relationship. Uniquely, we have found that when fly ash (lbs./cu. yd.) is a part of such a concrete mix, combinations of cement, fly ash and steel fiber do not follow such a straight line relationship. Instead, there is an optimum mix No. 2 (shown in Table I and plotted in FIG. 1) where such mix No. 2 having about 500 lbs./cu. yd. of cement has a greater flexural strength (p.s.i.) than either mix No. 1 having about 400 lbs./cu. yd. of cement or mix No. 3 having about 600 lbs./cu. yd. of cement.

Figure 3:
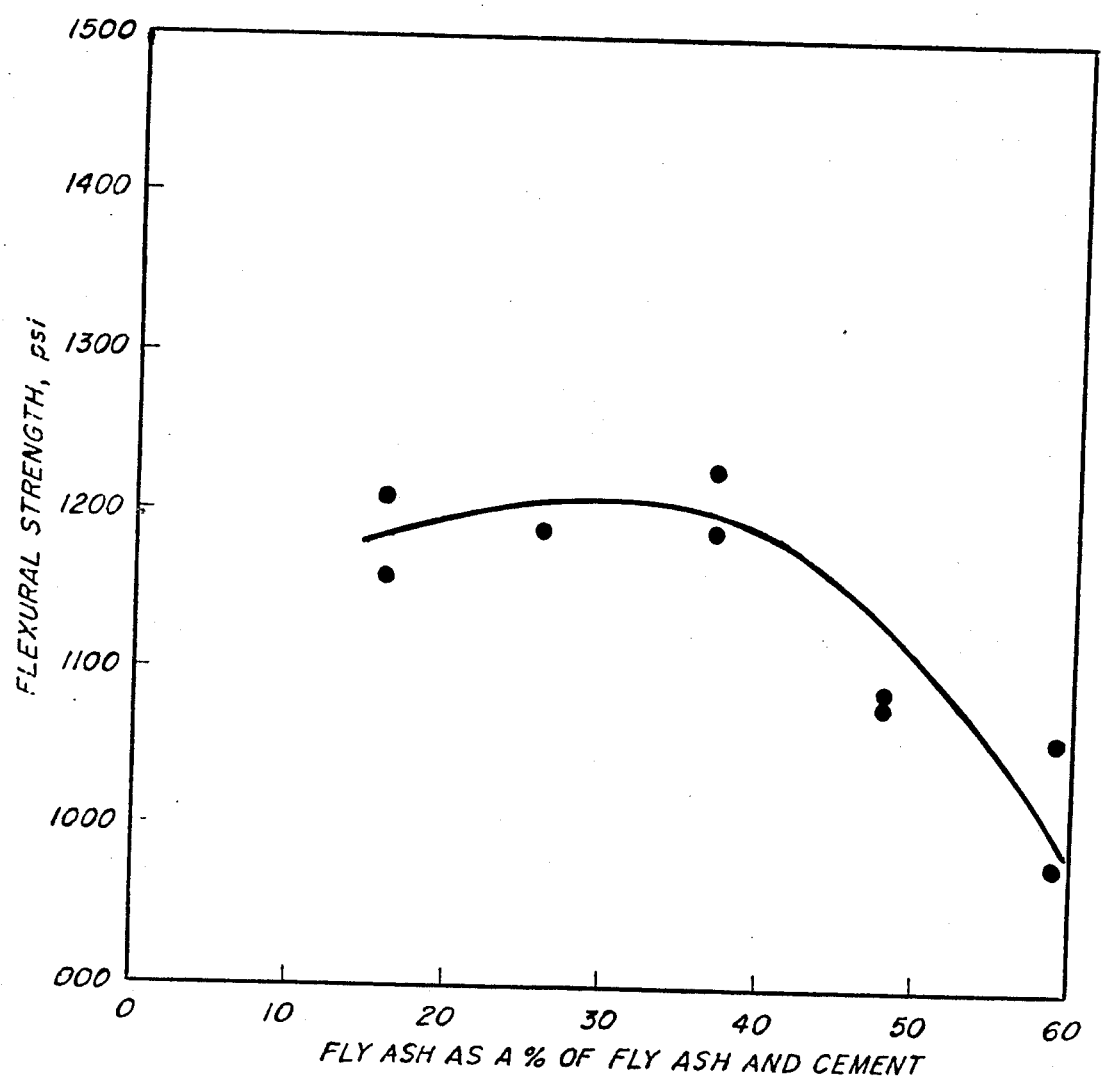
FIG. 3 is a graph showing flexural strength (p.s.i.) as ordinate vs. fly ash as a percent of total fly ash and cement for a 2" slump and a 1½" slump for about 1½% by volume of steel fiber where both slumps are plotted together.

Combined Tables II and III on the following page provides the data utilized in plotting FIGS. 2 and 3.

TABLES II AND III.—EFFECT OF FLY ASH CONTENT ON THE WATER CONTENT REQUIRED FOR A GIVEN SLUMP

| Mix number | Materials, lbs./cu. yd.[1] | | | 28-day flexural strength, p.s.i. | Solid volume, cu. ft./cu. yd. | | Fly ash, percent (solid vol.) |
|---|---|---|---|---|---|---|---|
| | Water | Cement | Fly ash | | Cement | Fly ash | |
| | | | | 1½ in. slump | | | |
| 1 | 250 | 300 | 360 | 1,060 | 1.53 | 2.26 | 59 |
| 2 | 260 | 400 | 300 | 1,090 | 2.04 | 1.89 | 48 |
| 3 | 270 | 500 | 234 | 1,230 | 2.55 | 1.47 | 37 |
| 4 | 280 | 600 | 170 | 1,190 | 3.06 | 1.07 | 26 |
| 5 | 300 | 700 | 106 | 1,160 | 3.57 | 0.67 | 16 |
| | | | | 2 in. slump | | | |
| 6 | 260 | 300 | 360 | 980 | 1.53 | 2.26 | 59 |
| 7 | 270 | 400 | 300 | 1,080 | 2.04 | 1.89 | 48 |
| 8 | 280 | 500 | 234 | 1,190 | 2.55 | 1.47 | 37 |
| 9 | 290 | 600 | 170 | 1,190 | 3.06 | 1.07 | 26 |
| 10 | 310 | 700 | 106 | 1,210 | 3.57 | 0.67 | 16 |

[1] In addition to approximately 1,310 lbs. of sand, 1,410 pounds of gravel and 200 pounds of fibers per cubic yard.

Air Entraining Agent

An air entraining agent of the type specified in the 1970 ASTM Standards C260–69 is also added to the matrix mass to increase workability, to reduce bleeding in the matrix mass and to resist damage caused by freezing of the matrix mass by creating minute bubbles uniformly distributed throughout the matrix mass, thus accommodating expansion of moisture upon freezing without fracture or rupture of the matrix mass. The entrained air is in the form of minute bubbles of air in the range of about 2.0 to about 12.0% by volume of the matrix mass.

Test Results

Table I provides the data utilized in plotting FIG. 1:

Referring to FIGS. 2, 3 and Table II, normally flexural strength (p.s.i) increases as the water content (lb./cu. yd.) in the concrete mix is reduced. Uniquely, we have found that the optimum mixes No. 3 and No. 8 (Table II) produce an optimum flexural strength (p.s.i.) and that thereafter as the water content (lbs./cu. yd.) is further reduced, flexural strength (p.s.i.) drops off.

Figure 4:
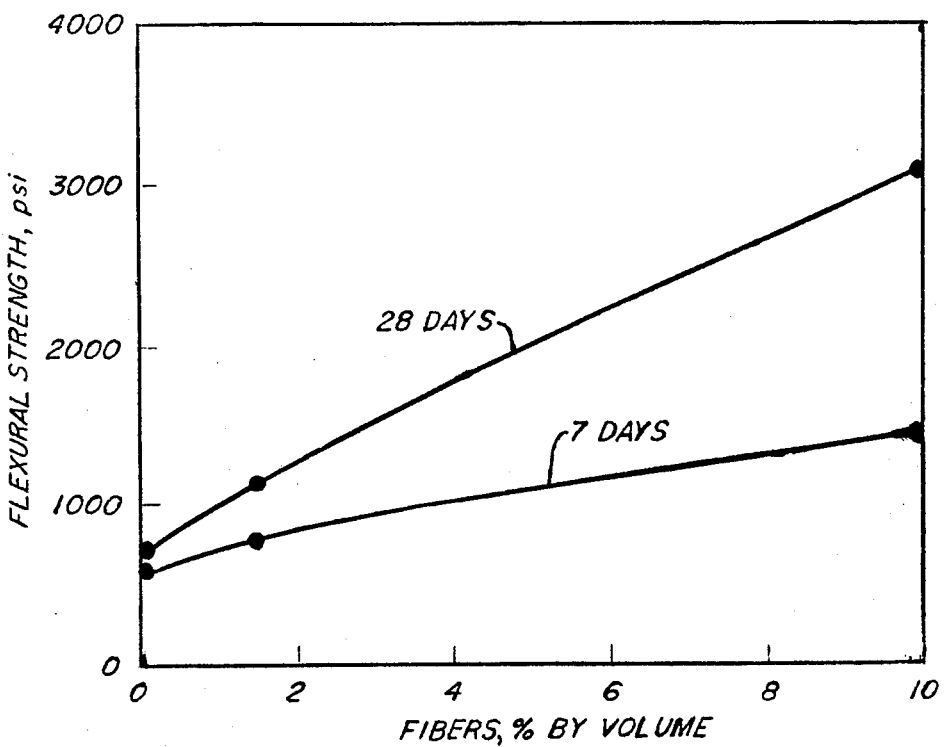
FIG. 4 is a graph showing flexural strength (p.s.i.) as ordinate vs. steel fiber as a percent by volume of the mortar mix for 7 and 28 day periods for the optimum cement and fly ash combination of about 500 lbs./cu. yd. of cement and about 234 lbs./cu. yd. of fly ash.

The data for FIG. 4 is shown below in Table IV.

TABLE IV.—MIXES FOR FIBER REINFORCED MORTARS AND CONCRETE

| Mix number | Water-cement ratio | Mix materials, lbs./cu. yd. | | | | | | Water reducer, fl. oz. | Slump, in. | Entrained air (percent vol.) | Flexural strength, p.s.i. after— | |
|---|---|---|---|---|---|---|---|---|---|---|---|---|
| | | Water | Cement | Fly ash | Sand[1] | Gravel | Steel fibers | | | | 7 days | 28 days |
| | | | | | Mortars | | | | | | | |
| P 10-1 | 0.62 | 310 | 500 | 234 | 2,720 | | 198.5 | 29.6 | 1 | 6.4 | 790 | 1,140 |
| P 10-2 | 0.60 | 300 | 500 | 234 | 2,780 | | 13.2 | 29.6 | 1 | 9.1 | 590 | 710 |
| P 10-3 | 1.12 | 560 | 500 | 234 | 2,353 | | 1,323.0 | 29.6 | ½ | 2.6 | 1,420 | 3,080 |

[1] The sand used in all the mixes except P 10-3 had a fineness modulus of 2.73; the sand used in mix P 10-3 had a fineness modulus of 0.96.

Referring to FIG. 4 and Table IV, it will be appreciated that as either the percent by volume or by weight/cu. yard of steel fiber in the mortar mix increases flexural strength (p.s.i.) increases in an approximately linear fashion.

TABLE I.—MIXES FOR FIBER REINFORCED CONCRETE

| Mix number | Water-cement ratio | Mix materials, lbs./cu. yd. | | | | | | Water reducer, fl. oz. | Slump, in. | Entrained air, percent (vol.) | Flexural strength, p.s.i.[1] after— | |
|---|---|---|---|---|---|---|---|---|---|---|---|---|
| | | Water | Cement | Fly ash | Sand | Pea gravel | Steel fibers | | | | 7 days | 28 days |
| 1 | 0.73 | 290 | 400 | 300 | 1,310 | 1,410 | 198.5 | 12 | 4½ | 6.5 | 1,020 | 1,040 |
| 2 | 0.56 | 280 | 500 | 234 | 1,310 | 1,410 | 198.5 | 16 | 4 | 6.8 | 890 | 1,320 |
| 3 | 0.50 | 300 | 600 | 170 | 1,310 | 1,410 | 198.5 | 20 | 4½ | 7.5 | 920 | 1,170 |

[1] Cured 7 days wet and 21 days dry.

Figure 5:
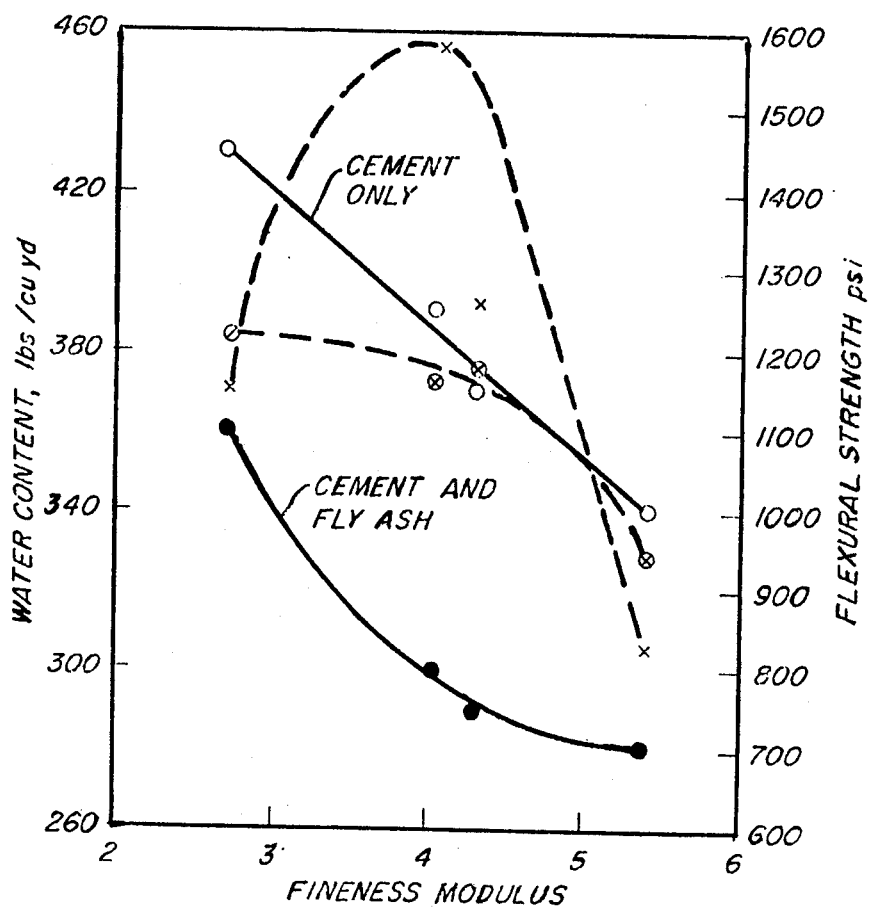
FIG. 5 is a graph showing water content (lbs./cu. yd.) in a mortar and concrete mix as ordinate vs. fineness modulus for the total either sand or sand an coarse aggregate constituents as abscissa showing how water content decreases with increased fineness modulus for mixes having about a 4" slump and about 500 lbs./cu. yd. of cement and about 234 lbs./cu. yd. of fly ash.

Table V provides the data for FIG. 5.

TABLE V.—EFFECT OF FINENESS MODULES ON THE WATER REQUIRED FOR MIXES HAVING A 4-IN. SLUMP

| Mix No.[1] | Aggregate, lbs./cu. yd. | | | | Water, lb./cu. yd. | Slump, in. | Fineness modulus | Strength, p.s.i., 28 days | | |
|---|---|---|---|---|---|---|---|---|---|---|
| | Sand | Pea gravel | ⅜-in. stone | ¾-in. gravel | | | | Comp. | Ten. | Flex |
| Mixes with 500 lbs. cement and 234 lbs. fly ash per cubic yard [2] | | | | | | | | | | |
| 1 | 2,780 | | | | 360 | 3¾ | 2.73 | 5,310 | 670 | 1,450 |
| 2 | 1,310 | 1,410 | | | 300 | 4¼ | 4.08 | 7,840 | 1,040 | 1,580 |
| 3 | 1,310 | | 1,410 | | 290 | 4 | 4.35 | 7,110 | 990 | 1,260 |
| 4 | 1,088 | | | 1,632 | 280 | 4 | 5.41 | 7,600 | 960 | 1,830 |
| Mixes with 800 lbs. cement per cubic yard and no fly ash [2] | | | | | | | | | | |
| 5 | 2,780 | | | | 430 | 4 | 2.73 | 6,310 | 780 | 1,220 |
| 6 | 1,310 | 1,410 | | | 390 | 4 | 4.08 | 5,700 | 780 | 1,160 |
| 7 | 1,310 | | 1,410 | | 370 | 4 | 4.35 | 5,660 | 740 | 1,180 |
| 8 | 1,088 | | | 1,632 | 340 | 4 | 5.41 | 6,840 | 920 | 940 |

[1] The steel fiber content was 1.5% by volume/cubic yard of concrete.
[2] The solid volume of cementitious materials is the same for both groups of mixes.

Heretofore, in the manufacture of steel fiber mortar or concrete mixes, excessive cement content has been required in the mixes in order to achieve satisfactory mixability and workability. As shown in FIG. 5 and Table V, greater water content (lbs./cu. yd.) is required for a low fineness modulus. Comparing mixes No. 1–4 of Table V with mixes No. 5–8 of Table V, it is evident the mixes No. 1–4 provide an equivalent mixability and workability while uniquely providing greater compressing tensile and flexural strengths by the addition of fly ash and the dramatic reduction of the water content and the cement content. The addition of fly ash (lbs./cu. yd.) permits the use of coarser aggregate <⅜" (fineness modulus >4.0) and a lower water content (lbs./cu. yd) thereby resulting in satisfactory workability and enhanced flexural strength (p.s.i.).

ALTERNATIVE EMBODIMENTS

It will be understood by those skilled in the art from a consideration of the above test data, that alternatively the cement employed may be a hydraulic cement selected from the group including shrinkage compensating cement, expansive cement, and regulated set cement, Portland cement, Portland blast furnace slag cement, Portland pozzolan cement or the like.

The discontinuous filaments may be one of the group including discontinuous fiberglass reinforcing filaments, nylon reinforcing filaments, carbon reinforcing filaments, graphite reinforcing filaments, thermosetting plastic fiber reinforcing filaments, such as of the polyester type, thermoplastic fiber reinforcing filaments, such as polyethylene, polyvinyl chloride or the like, alkali resistant fiberglass filaments or epoxy coated fiberglass filaments, titanium reinforcing filaments, tungsten reinforcing filaments, copper reinforcing filaments, lead reinforcing filaments, steel reinforcing filaments, or the like.

Fly Ash

Further, the pozzolan type fly ash may be replaced by a finely divided material from the group including diatomaceous earths, opalene, cherts, shales, tuffs, volcanic ashes or pumices, clays, shales, pumicites, diatomites, or the like. Such finely divided fly ash or pozzolan type finely divided material should have a surface area greater than 6500 cm.$^2$/cm.$^3$ and should otherwise comply with requirements of ASTM C-618.

The aggregate will be in part or in entirety a fine aggregate having a fineness modulus in the range of about 1.0 to about 3.3 and of the type described in the ASTM Standards C33. In addition to the fine aggregate, coarse aggregate may also be employed. Coarse aggregate may be employed in the concrete matrix mass and be Type 7 or 8, according to the specifications of such Section C33 of the ASTM Standards and have a fineness modulus in the range of about 5.0 to about 7.5 with a minimum aggregate size of about 1.0". Aggregates used, both fine and coarse, should be of the type and size gradation locally and economically available. Aggregates consisting of properly graded materials having a maximum size usually to about 1.0" and fineness modulus in the range of about 1.0 to about 7.5 are satisfactory.

From the above data shown in Tables I–V, it will be appreciated that a castable concrete matrix mass will preferably use a coarse aggregate as described in the range of about 0 pounds to about 2000 pounds per cubic yard, and preferably about 1050 pounds to about 1450 pounds per cubic yard of the concrete matrix mass. In the case of a mortar matrix mass, the fine aggregate or sand desirably is contained in the mortar matrix mass in the range of about 2200 pounds to about 3000 pounds per cubic yard of the mortar matrix mass.

SUMMARY OF THE ACHIEVEMENTS OF THE OBJECTS OF THE INVENTION

It will be recognized by those skilled in the art that the objects of this invention have been achieved by providing an improved reinforced composite which utilizes a hydraulic cement for bonding the matrix mass of the reinforced composite together; utilizes water in the matrix mass of the reinforced composite in sufficient amount to hydrate the cement in the matrix mass, to provide positioning (flexibility), and screeding, troweling, consolidating and finishing (workability) in the matrix mass and to provide a predetermined slump in the matrix mass of the reinforced composite; and utilizes a plurality of discontinuous reinforcing filaments to reinforce the matrix mass, to restrict crack propagation in the matrix mass and to increase flexibility in the matrix mass. The matrix mass has a finely divided pozzolan (fly ash) in the matrix mass of the reinforced composite to improve flexibility and workability in the matrix mass, to reduce the volume of cement but maintaining the necessary volume of paste and reducing cost, to reduce the amount of water in the matrix mass thereby increasing the strength characteristics of the matrix mass and thereby also reduce cracking due to drying shrinkage in the matrix mass, to fill the interstitial spaces in the matrix mass and to enhance the mechanical lubricity of the matrix mass by reducing the cement content in the matrix mass, to reduce the free lime or soluble salts, such as $Ca(OH)_2$, $CaSO_4$ or the like, thereby reducing leaching of lime out of the matrix mass and to provide additional cementitious compounds, i.e., calcium silicates, calcium aluminates, or the like, to reduce segregation of the cement, the discontinuous filaments, and the aggregate in the matrix mass by filling the intersticial voids therebetween, to reduce permeability of a fluid through the matrix mass after such matrix mass has hardened, to provide resistance in the matrix mass to sulfate and acid attack contained in surrounding earth or soil, to reduce the deterioration of the matrix mass due to an alkali aggregate reaction; provides enhanced resistance to fatigue cracking in the matrix mass; to enhance the long term strength of the matrix mass due to the increased long term strength of the pozzolan or fly ash; and to permit a thinner section (than a conventional section) of the matrix mass to be formed due to the mechanical lubricity of the fly ash.

The matrix mass also utilizes an appropriate amount of an aggregate which, when added to the cement, the water, the filaments, and the pozzolan or fly ash, provides an inert filler material which is resistant to wear and abrasion when the aggregate is bonded to the matrix mass by the cement, and reducing the cost of the matrix mass.

The reinforced composite provides increased long term skid resistance on the matrix mass due to the surface roughness caused by the filaments and aggregates following finishing; provides increased resistance to defect and crack reflection in the matrix mass from an underlying base in an overlay application; provides a minimum number of joints in the hardened matrix mass in a sidewalk or highway application; and provides enhanced resistance to fatigue cracking in the matrix mass.

While in accordance with the patent statutes, preferred and alternative embodiments of this invention have been illustrated and described in detail, it is to be particularly understood that the invention is not limited thereto or thereby.

I claim:
1. A fiber-reinforced, shrinkage-compensated crack-resistant mortar or concrete mix, comprising, per cubic yard of mix:
  (a) about 700 to 800 pounds of a mixture of an hydraulic cement and fly-ash, wherein the fly-ash component is about 230 pounds;
  (b) about 270 to 310 pounds of water;
  (c) discontinuous steel fiber reinforcements in amount of about 0.1 to 10% by volume of the mix; and
  (d) balance aggregate selected from the group consisting of fine aggregate having a fineness modulus in the range of about 1.0 to about 3.3, with or without coarse aggregate having a fineness modulus from 5.0 to about 7.5.

References Cited
UNITED STATES PATENTS

| | | | |
|---|---|---|---|
| 3,645,961 | 2/1972 | Goldfein | 106—99 |
| 3,679,445 | 7/1972 | Howe | 106—99 |
| 3,650,785 | 3/1972 | Ball et al. | 106—99 |

DELBERT E. GANTZ, Primary Examiner

J. W. HELLWEGE, Assistant Examiner

U.S. Cl. X.R.

106—DIG. 1, 98

UNITED STATES PATENT OFFICE
CERTIFICATE OF CORRECTION

Patent No. 3,834,916    Dated September 10, 1974

Inventor(s) Clyde E. Kesler

It is certified that error appears in the above-identified patent and that said Letters Patent are hereby corrected as shown below:

Column 3, line 17, "an" should read -- and --. Columns 5 and 6, Table IV, "Mortars" should appear immediately below "Mix Number:" rather than in column 7 of Table IV. Column 10, claim 1, line 14, before "5.0" insert -- about --.

Signed and sealed this 28th day of January 1975.

(SEAL)
Attest:

McCOY M. GIBSON JR.
Attesting Officer

C. MARSHALL DANN
Commissioner of Patents